US011865864B2

(12) United States Patent
Riech (10) Patent No.: US 11,865,864 B2
(45) Date of Patent: Jan. 9, 2024

(54) TRIM FOR A RIM OF A WHEEL OF A VEHICLE, IN PARTICULAR A MOTOR VEHICLE, ARRANGEMENT OF SUCH A TRIM ON A RIM FOR A WHEEL OF A VEHICLE, AND VEHICLE

(71) Applicant: AUDI AG, Ingolstadt (DE)

(72) Inventor: Christian Riech, Unterschleißheim (DE)

(73) Assignee: AUDI AG, Ingolstadt (DE)

( * ) Notice: Subject to any disclaimer, the term of this patent is extended or adjusted under 35 U.S.C. 154(b) by 648 days.

(21) Appl. No.: 17/051,207

(22) PCT Filed: May 7, 2019

(86) PCT No.: PCT/EP2019/061617
§ 371 (c)(1),
(2) Date: Oct. 28, 2020

(87) PCT Pub. No.: WO2019/233688
PCT Pub. Date: Dec. 12, 2019

(65) Prior Publication Data
US 2021/0053390 A1 Feb. 25, 2021

(30) Foreign Application Priority Data

Jun. 4, 2018 (DE) ...................... 10 2018 208 748.2

(51) Int. Cl.
*B60B 7/04* (2006.01)
*B60B 7/00* (2006.01)
(Continued)

(52) U.S. Cl.
CPC .............. *B60B 7/04* (2013.01); *B60B 7/0086* (2013.01); *B60B 7/14* (2013.01); *B60B 1/06* (2013.01);
(Continued)

(58) Field of Classification Search
CPC ........... B60B 7/0086; B60B 7/04; B60B 7/14; B60B 2900/513
See application file for complete search history.

(56) References Cited

U.S. PATENT DOCUMENTS 2,790,681 A 4/1957 Lyon
2,857,023 A 10/1958 Lyon
(Continued)

FOREIGN PATENT DOCUMENTS

CN 104837646 A 8/2015
DE 3210405 A1 9/1983
(Continued)

OTHER PUBLICATIONS

Notification of Transmittal of Translation of the International Preliminary Report on Patentability dated Dec. 17, 2020, in connection with corresponding international application No. PCT/EP2019/061617 (9 pages).

(Continued)

*Primary Examiner* — Kip T Kotter
(74) *Attorney, Agent, or Firm* — Maier & Maier, PLLC (57) ABSTRACT

A cover for a rim of a wheel of a vehicle. The cover, with fastening of the cover on the rim, can be arranged in at least partially overlap with a through opening of the rim delimited in the circumferential direction of the rim by respective spokes of the rim, whereby the through opening can be at least partially covered by the cover. The cover is directionally formed and has at least two slats, which delimit at least one channel arranged between the slats, through which air can flow in the installed position of the cover diagonally to a plane extending perpendicularly to the axial direction of the rim. The slats at least partially mutually overlap with (Continued)

respect to the installed position of the cover in the circumferential direction of the rim and along the axial direction of the rim.

10 Claims, 5 Drawing Sheets

(51) Int. Cl.
  *B60B 7/14* (2006.01)
  *B60B 1/06* (2006.01)
(52) U.S. Cl.
  CPC ... *B60B 2900/111* (2013.01); *B60B 2900/513* (2013.01)

(56) References Cited

U.S. PATENT DOCUMENTS

| | | | | |
|---|---|---|---|---|
| 2,857,206 A | * | 10/1958 | Lyon | ............ B60B 7/14 |
| | | | | 301/37.39 |
| 2012/0080932 A1 | * | 4/2012 | Ilse | ............ B60B 19/10 |
| | | | | 301/6.3 |
| 2014/0191564 A1 | | 7/2014 | Gebeau | |

FOREIGN PATENT DOCUMENTS

| | | | | |
|---|---|---|---|---|
| DE | 102008007690 A1 | | 8/2009 | |
| DE | 202009013418 U1 | | 2/2011 | |
| DE | 202014004316 U1 | | 7/2014 | |
| EP | 3153327 A1 | | 4/2017 | |
| EP | 3153328 A1 | | 4/2017 | |
| FR | 2998507 A1 | * | 5/2014 | ........... B60B 7/0086 |
| FR | 3041897 A1 | * | 4/2017 | ........... B60B 7/0086 |
| FR | 3041898 A1 | * | 4/2017 | ........... B60B 7/0066 |
| FR | 3043944 A1 | | 5/2017 | |
| WO | 2017/137673 A1 | | 8/2017 | |

OTHER PUBLICATIONS

Chinese Office Action, dated Jun. 30, 2022, in corresponding Chinese Patent Application No. 201980033526.0; 9 pages.
German Search Report dated Jun. 6, 2019 in corresponding German Application No. 10 2018 208 748.2; 20 bages; Machine translation attached.
International Search Report (with English translation) and Written Opinion (with Machine translation) dated Jul. 17, 2019 in corresponding International Application No. PCT/EP2019/061617; 19 pages.

* cited by examiner

Fig.10 though opening can be at least partially covered or closed by means of the cover. In other words, the cover can be fastened, in particular reversibly detachably, on the rim and can thus be arranged in at least partial overlap with the mentioned through opening of the rim. In particular, the cover can be at least partially inserted into the through opening and fastened on the rim at the same time, so that, for example, in the completely produced state of the wheel comprising the rim and the cover fastened thereon, the cover is arranged at least partially in the through opening. The through opening is delimited here in the circumferential direction of the rim on both sides by the mentioned spokes, which are also referred to as struts, for example. The struts extend, for example in the radial direction of the rim from the inside to the outside and at the same time from a central region of the rim to an outer ring of the rim, so that, for example the outer ring is connected via the spokes to the central region.

TRIM FOR A RIM OF A WHEEL OF A VEHICLE, IN PARTICULAR A MOTOR VEHICLE, ARRANGEMENT OF SUCH A TRIM ON A RIM FOR A WHEEL OF A VEHICLE, AND VEHICLE

FIELD

The invention relates to a cover for a rim of a wheel of a vehicle, in particular a motor vehicle. Furthermore, the invention relates to an arrangement of at least one cover on a rim for a wheel of a vehicle, in particular a motor vehicle. The invention furthermore relates to a vehicle, in particular a motor vehicle.

BACKGROUND

DE 20 2009 013 418 U1 discloses a rim for a motor vehicle, having a rim outer ring for fastening a tire on the rim. The rim additionally has a central flange section for fastening the rim on a wheel hub of the motor vehicle and a star-shaped connecting region arranged between rim outer ring and central flange section having a plurality of oblong webs, the respective longitudinal axes of which extend starting from the rim outer ring radially inward to the central flange section. Of the webs, one or more, in particular all, respectively has a recess, in particular a recess elongated in the radial direction, for accommodating an insert element. In addition, the rim comprises a respective insert element of a first type, which is insertable into the respective recess and is fastenable on the associated web.

DE 32 10 405 A1 discloses a wind turbine for generating wind power, in particular for weak wind areas, having windward and leeward side conical cladding for air guiding, an average number of pivotable wings, which are automatically adjusted via auxiliary wind turbine and centrifugal force regulator, wherein multiple generators graduated in size can be switched on or switched off according to the wind power via wind pressure switches and magnetic couplings.

In addition, an aerodynamic system in a motor vehicle rim for generating energy by means of wind and a wind turbine in the rim is known from DE 10 2014 004 316 U1. Wind flows generated by the rim inside the rim are used to rotate a rotating wheel, which is connected to a power generator.

SUMMARY

The object of the present invention is to refine a cover, an arrangement, and a vehicle of the type mentioned at the outset in such a way that particularly advantageous aerodynamics can be implemented in a particularly weight-favorable manner.

A first aspect of the invention relates to a cover, which is also referred to as an insert element, panel, or panel element, for a rim of a wheel of a vehicle, in particular a motor vehicle. The cover can be arranged, with fastening of the cover on the rim, in at least partial overlap or coverage with a through opening of the rim delimited in the circumferential direction of the rim by respective spokes of the rim, whereby the through opening can be at least partially covered or closed by means of the cover. In other words, the cover can be fastened, in particular reversibly detachably, on the rim and can thus be arranged in at least partial overlap with the mentioned through opening of the rim. In particular, the cover can be at least partially inserted into the through opening and fastened on the rim at the same time, so that, for example, in the completely produced state of the wheel comprising the rim and the cover fastened thereon, the cover is arranged at least partially in the through opening. The through opening is delimited here in the circumferential direction of the rim on both sides by the mentioned spokes, which are also referred to as struts, for example. The struts extend, for example in the radial direction of the rim from the inside to the outside and at the same time from a central region of the rim to an outer ring of the rim, so that, for example the outer ring is connected via the spokes to the central region.

In particular, the spokes can be integrally formed with the outer ring and/or can be integrally formed with the central region. In the central region, the rim has a hub, also referred to as a rim hub, for example, in which, for example an extension of a wheel hub of the vehicle can be at least partially arranged. By means of the central region, the rim can be connected at least in a rotationally-fixed manner to the wheel hub, in particular reversibly detachably. The rim can be formed from a metallic material, in particular from a light metal. Alternatively or additionally, the rim can be produced by molding, in particular by casting. In particular, it is conceivable that the rim is formed as an aluminum rim or as a light metal rim.

To be able to implement particularly advantageous aerodynamics of the wheel and thus of the vehicle, preferably designed as a motor vehicle, in particular as an automobile and in this case preferably as a passenger vehicle, as a whole in a particularly weight-favorable manner, it is provided according to the invention that the cover is directionally formed and has at least two slats, which delimit at least one channel arranged between the slats. In the installed position of the cover, air can flow through the channel, in particular exclusively, diagonally to a plane extending perpendicularly to the axial direction of the rim. In other words, in the installed position of the cover, air can flow through the channel, in particular exclusively, along a plane extending diagonally to a perpendicular to the axial direction of the rim. The cover assumes its installed position in the state fastened on the rim. In particular, the cover assumes its installed position in the completely produced state of the wheel, wherein the wheel comprises, in its completely produced state, the rim and the cover fastened thereon, in particular reversibly detachably. The cover has, for example, at least one fastening element, by means of which the cover is fastenable on the rim, in particular reversibly detachably. In the completely produced state of the wheel, the cover is fastened on the rim by means of its fastening element, in particular reversibly detachably. In particular, the cover assumes its installed position in the completely produced state of the vehicle as a whole. In the completely produced state of the vehicle, the rim is connected to the wheel hub, in particular reversibly detachably, and the cover is fastened on the rim, in particular reversibly detachably, for example by means of the fastening element. In the completely produced state of the vehicle, the axial direction of the rim coincides with a rotational axis around which the rim and the wheel hub, which is connected in a rotationally-fixed manner to the rim, are rotatable in relation to a wheel mount or in relation to a body of the vehicle, designed, for example, as a self-supporting vehicle body.

Furthermore, it is provided according to the invention that the slats mutually cover or overlap one another, with respect to the installed position of the cover, in the circumferential direction of the rim and along the axial direction of the rim. The circumferential direction extends here around the axial direction or around the rotational axis of the rim, so that the slats at least partially mutually cover or overlap one another, with respect to the installed position of the cover, in the circumferential direction of the rim extending around the axial direction or around the rotational axis of the rim and along the axial direction of the rim. In this manner, it is possible to close the through opening of the rim over a particularly large area by means of the cover, so that unfavorable airflows or air turbulence can be avoided, in particular during forward travel of the vehicle. In addition, the weight of the wheel and thus of the vehicle as a whole can be kept particularly low, since the cover and the rim are formed as components formed separately from one another and connectable or connected to one another. The weight of the cover as such can thus be kept particularly low, so that the through opening of the rim can be at least partially covered and thus closed in a particularly weight-favorable manner.

The feature that the cover is directionally formed is also referred to as the directionality of the cover. In its completely produced state, for example, the vehicle has the mentioned wheel and at least one second wheel, wherein the wheels are assigned, for example, to an axle of the vehicle. In the completely produced state of the vehicle, the wheels are spaced apart from one another in the vehicle transverse direction here, wherein the vehicle, when it stands on the ground, is supported downward on the ground via the wheels in the vehicle vertical direction. During the above-mentioned forward travel of the vehicle, it is supported via the wheels on the above-mentioned ground or on a roadway, along which the vehicle is driven forward during the forward travel. During the forward travel, the wheels rotate in relation to the body in a forward rotational direction. This means that the rim rotates around its rotational axis in relation to the body in the forward rotational direction. The directionality is to be understood to mean that the cover cannot simply be used for both wheels or for the rims of both wheels or that the cover does not cause the desired effects in both wheels, but rather only in the first wheel. The first wheel is, for example, a right wheel in the vehicle transverse direction and in the vehicle longitudinal direction or in the forward travel direction, while the second wheel is a left wheel. The cover is thus designed, for example for the right wheel and can be used for the rim of the right wheel. However, the cover cannot be used for the rim of the left wheel or cannot cause the same advantageous effects with respect to the left wheel as for the right wheel.

The slats are preferably arranged one behind another or successively in the circumferential direction of the rim. Since the slats mutually overlap, the through opening of the rim can be closed over a particularly large area and in a weight-favorable manner. At the same time, however, the cover enables air to be able to flow through the cover, in particular during the forward travel. In particular during the forward travel, the air can flow through the channel and thus between the slats, so that, for example, a braking system of the vehicle arranged on a side of the rim facing away from the cover in the axial direction of the rim can be supplied adequately with air and thus can be adequately cooled. However, since air can flow through the channel, in particular exclusively, diagonally to the described imaginary or virtual plane, unfavorable and undesired airflows or air turbulence can be avoided, so that particularly advantageous aerodynamics can be implemented.

The invention is based in particular on the following finding: In the context of the development of modern wheels, in particular modern passenger vehicles, wheels, in particular so-called aluminum wheels of the vehicles have been aerodynamically optimized. An aluminum wheel is to be understood as such a wheel, the rim of which is formed, for example from a light metal, in particular from aluminum. To implement advantageous aerodynamics of a wheel, it is advantageous for a surface of the rim, which is closed in particular, to be as large as possible or a degree of opening of ventilation holes of the rim to be as small as possible. A ring-shaped widening on the rim can represent a further advantage for implementing particularly good dynamics. The closed large surface can be formed, for example, in such a way that it has a wedge shape or has a wedge function, by means of which air rotating during forward travel is guided in the direction of the central region of the rim. In this way, undesired turbulence can be avoided. A particularly advantageous aerodynamic effect results due to a directionality of the wheel or the rim. A large closed surface of a rim is typically produced by material from which the rim as a whole is produced. The implementation of a large closed surface of a rim is thus typically linked to a material accumulation, whereby the rim and thus the wheel has a very high weight. This is disadvantageous since the wheel represents an unsprung mass in the completely produced state of the vehicle.

It is now possible by means of the cover according to the invention to implement a particularly large closed surface of the wheel in a particularly weight-favorable manner. The closed surface of the wheel extends, for example, in the above-described plane extending perpendicularly to the axial direction of the rim or is a surface formed in particular by material which is airtight in the axial direction of the rim or through which air cannot flow.

By means of the cover according to the invention, it is possible to implement a particularly large closed surface of the wheel in such a way that a first part of the closed surface is formed by the rim or by its spokes, while a second part of the closed surface is formed by the cover, in particular by the slats. It is possible here in particular to produce the rim and the cover from materials or substances different from one another, so that the weight of the wheel and thus of the motor vehicle as a whole can be kept particularly low. The unsprung mass can thus be kept to a particularly small amount.

Since the slats mutually overlap or cover one another both in the circumferential direction and thus, for example in the above-mentioned plane, and also in the axial direction of the rim, the cover is closed, for example, both in the circumferential direction or in the forward rotational direction of the rim and also in the axial direction of the rim, so that particularly advantageous aerodynamics can be implemented.

It has proven to be particularly advantageous in this case if the slats mutually overlap in such a way that the channel is secured, with respect to the installed position of the cover, both against a through airflow extending precisely along the axial direction of the rim and also against a through airflow extending in the plane. This means that air cannot flow through the channel precisely along the axial direction of the rim or in the plane, i.e., not precisely in the circumferential direction of the rim nor through the channel, but rather air can flow through the channel, for example exclusively along the above-described plane extending diagonally to the perpendicular to the axial direction of the rim. The cover is therefore more or less airtight to air precisely in the circumferential direction of the rim and precisely in the axial direction of the rim and represents or provides a closed surface for air, so that a particularly large closed surface of the air can be provided as a whole. Particularly good aerodynamics can thus be ensured. Nonetheless, the cover has the channel to supply the braking system with an adequate quantity of air.

A further embodiment is distinguished in that the slats are curved against the forward rotational direction of the rim with respect to the installed position of the cover. The forward rotational direction, in which the rim and with it the cover rotate during forward travel of the vehicle, is also referred to as the running direction. The feature that the slats are curved against the forward rotational direction of the rim with respect to the installed position of the cover is to be understood that the slats are oriented against the running direction. A particularly advantageous directionality of the slats and thus of the cover as a whole is represented in this way, so that particularly advantageous aerodynamics can be implemented.

It has been shown to be advantageous if the slats or the cover as a whole are or is designed, with respect to the installed position of the cover, to effectuate a negative pressure on a rear side of the cover facing toward the rim during a rotation of the rim and the cover fastened thereon taking place in the forward direction of the rim and thus during forward travel of the vehicle. In particular, the slats or the cover are designed to cause a negative pressure on the side of the rim facing away from the cover, in particular the spokes, wherein the side of the rim facing away from the cover faces toward the braking system. In this way, during a rotation of the wheel in the forward rotational direction, a negative pressure results on the side and thus in the region of the braking system, so that hot air from the braking system is discharged forward and ventilation of the braking system from the rear is ensured. Particularly advantageous aerodynamics can thus be implemented, and at the same time excessive temperatures of the braking system, also simply referred to as a brake system, can be avoided.

A further embodiment is distinguished in that the slats, with respect to the installed position of the cover, mutually overlap completely in the circumferential direction of the rim. In this way the cover is formed quasi-closed in the plane or in the circumferential direction of the rim, so that undesired airflows and turbulence can be avoided. Nonetheless, air can flow through the cover via the channel to be able to sufficiently ventilate or cool the braking system.

In a further design of the invention, it is provided that the slats are integrally formed with one another. The weight of the cover can thus be kept to a particularly small amount in this way.

A further embodiment is distinguished in that the cover is formed from a plastic, in particular from a fiber-reinforced plastic. The weight of the cover can thus be kept to a particularly small amount in this way. The fiber-reinforced plastic preferably includes carbon, i.e., it is at least partially carbon-fiber-reinforced plastic. A particularly high rigidity of the cover can thus be ensured at the same time, so that the cover does not excessively deform during a rotation of the rim at high speeds.

To be able to ensure a particularly low weight of the cover and a particularly simple production of the cover, it is provided in a further design of the invention that the cover is produced by a generative manufacturing method, in particular by 3D printing. Since the slats preferably mutually overlap or cover one another over a large area, the cover has an undercut formed by the slats, for example. This undercut is also referred to as undercutting of the slats oriented on one another, for example. Such undercutting can make a large-scale mass production of the cover, in particular a production of the cover by injection molding, much more difficult or even impossible. The use of a generative manufacturing method, in particular the use of 3D printing, enables the cover to be produced easily and cost-effectively even in the context of large-scale mass production.

Furthermore, it is preferably provided that the cover has at least one opening, preferably designed as a through opening, which can be penetrated by a valve of the wheel or is penetrated in the completely produced state of the wheel. In its completely produced state, for example, the wheel has a tire formed in particular from rubber, which is pulled onto the rim. The rim and the tire delimit a receptacle chamber, in which air can be accommodated or is accommodated, in particular to inflate or pump up the tire. Air can be introduced into the receptacle chamber via the valve. Furthermore, air can be discharged from the receptacle chamber, for example via the valve.

The rim has, for example multiple through openings arranged successively in the circumferential direction of the rim and delimited by respective spokes of the rim, to which the preceding and following statements on the first through opening can be transferred and vice versa. The respective through opening is at least partially covered by means of a respective cover and thus closed. Since the wheel has precisely one valve, for example, only one of the covers has an opening formed in particular as a through opening, for example, which can be penetrated or is penetrated by the valve. Therefore, at least two different structural variants of the covers can be used per wheel. In a first of the structural variants, the cover has the opening for the valve. In the second structural variant, the cover does not have this opening for the valve. These different structural variants of the cover can be produced in a particularly simple and cost-effective manner by the generative manufacturing method, in particular by the 3D printing. Significantly more cost-effective mass production can thus be implemented in particular than by injection molding.

A second aspect of the invention relates to an arrangement of at least one cover, in particular at least one cover according to the invention, on a rim for a wheel of the vehicle. In the arrangement, the cover is fastened, in particular reversibly detachably, on the rim. Furthermore, in the arrangement, the cover is arranged in at least partial overlap or coverage with a through opening of the rim delimited in the circumferential direction of the rim by respective spokes of the rim, in particular on both sides, whereby the through opening is at least partially, in particular at least predominantly or completely, covered by means of the cover and is thus closed in the axial direction of the rim.

To be able to implement particularly advantageous aerodynamics in a particularly weight-favorable manner, it is provided according to the invention that the cover is directionally formed and has at least two slats. The slats overlap one another at least partially in each case in the circumferential direction of the rim and along the axial direction of the rim. Moreover, the slats delimit at least one channel, which is arranged between the slats and through which air can flow, in particular exclusively, diagonally to a plane extending perpendicularly to the axial direction of the rim. Advantages and advantageous designs of the first aspect of the invention are to be considered advantages and advantageous designs of the second aspect of the invention and vice versa.

To be able to implement particularly good aerodynamics, it is provided in an advantageous design of the invention that the through opening is at least predominantly, in particular completely, covered by means of the cover and thus closed in the axial direction of the rim.

A third aspect of the invention relates to a vehicle designed as a motor vehicle, in particular as an automobile. The vehicle has at least one cover according to the invention according to the first aspect of the invention and/or at least one arrangement according to the second aspect of the invention. Advantages and advantageous designs of the first aspect of the invention and the second aspect of the invention are to be considered advantages and advantageous designs of the third aspect of the invention and vice versa.

The invention also comprises combinations of the features of the described embodiments. The invention also includes refinements of the arrangement according to the invention and the vehicle according to the invention, which have features as have already been described in conjunction with the refinements of the cover according to the invention. For this reason, the corresponding refinements of the arrangement according to the invention and the vehicle according to the invention are not described once again here.

BRIEF DESCRIPTION OF THE FIGURES

An exemplary embodiment of the invention is described hereinafter. In the figures.

DETAILED DESCRIPTION

The exemplary embodiment explained hereinafter is a preferred embodiment of the invention. In the exemplary embodiment, the described components of the embodiment each represent individual features of the invention to be considered independently of one another, which can each also refine the invention independently of one another and are thus also to be considered to be part of the invention individually or in a combination other than that shown. Furthermore, the described embodiment can also be supplemented by further ones of the above-described features of the invention.

In the figures, identical reference signs each identify functionally-identical elements.

Figure 9:
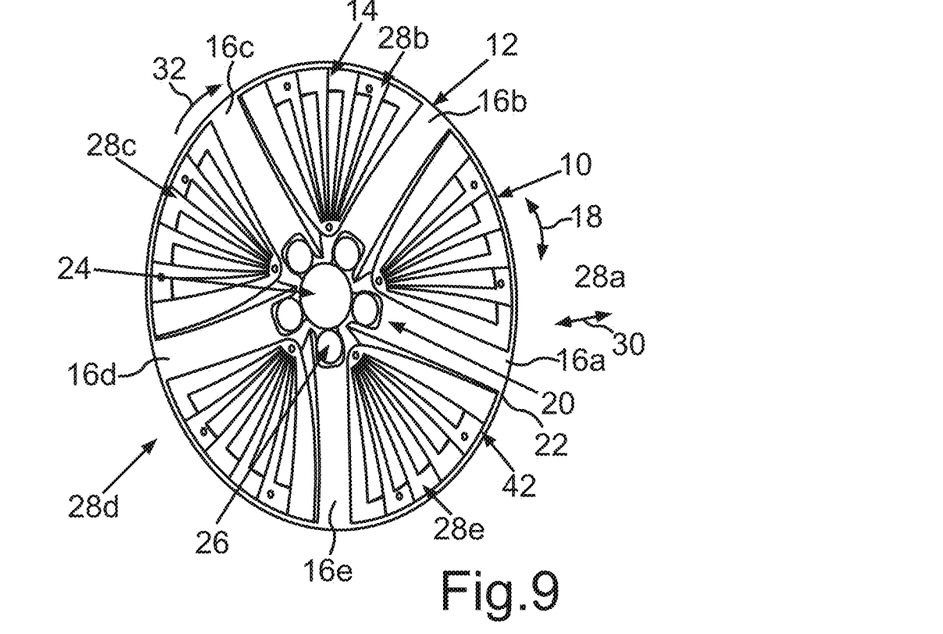
FIG. 9 shows a schematic perspective view of the cover on the rim.
Figure 10:
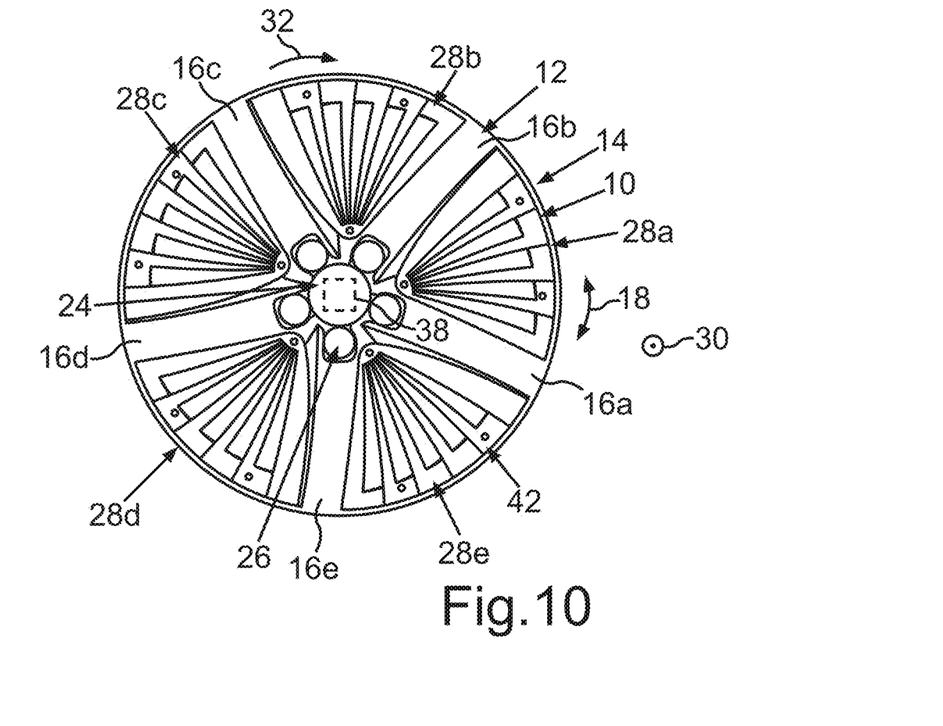
FIG. 10 shows a schematic front view of the arrangement.

FIGS. 1 to 8 show a cover 10 for a rim 12, recognizable from FIGS. 9 and 10, of a wheel of a vehicle. In this case, FIGS. 9 and 10 show an arrangement 14 of the cover 10 on the rim 12, also referred to as a mounting arrangement or fastening arrangement. In the arrangement 14, the cover 10 is fastened reversibly detachably on the rim 12. In the completely produced state of the vehicle, it has a body designed, for example, as a self-supporting vehicle body and two axles arranged successively or one after another in the vehicle longitudinal direction. The respective axle comprises, for example at least two wheels spaced apart from one another in the vehicle transverse direction, wherein the following and preceding statements are transferable to the arrangement 14, to the rim 12, and to the cover 10 on the respective wheel. In the completely produced state of the vehicle, the wheels are rotatable around respective rotational axes in relation to the body and are held at least indirectly rotatably on the body at the same time. In its completely produced state, the vehicle can be supported or is supported downward on the ground or on a roadway via the wheels in the vehicle vertical direction. If the vehicle is driven forward along the roadway in a state in which the vehicle is supported from top to bottom via the wheels in the vehicle vertical direction, the wheels thus rotate around the respective rotational axes in a forward rotational direction, which is also referred to as the running direction of the respective wheel and thus of the rim 12.

It is apparent from FIGS. 9 and 10 that the rim 12 has multiple spokes 16a-e, which are arranged one behind another or successively in the circumferential direction of the rim 12. The circumferential direction of the rim 12 is illustrated in FIGS. 9 and 10 by a double arrow 18. The rim 12 additionally has a central region 20 and an outer ring 22, which is connected via the spokes 16a-e, also referred to as struts or webs, to the central region 20. In particular, the spokes 16a-e, the outer ring 22, and the central region 20 are integrally formed with one another. The central region 20 has a hub 24, in which an extension of a wheel above the vehicle can be arranged. In addition, the central region 20 has screw openings 26 formed as through openings, through which screw elements, for example in the form of wheel screws or threaded bolts, can be inserted. By means of the screw elements, the rim 12 and thus the wheel as a whole can be connected in a rotationally-fixed manner to the wheel hub, so that the wheel can be rotatably coupled via the wheel hub to the body. Furthermore, the rim 12 and thus the wheel can be secured on the wheel hub by means of the screw elements in the axial direction of the rim 12.

Respective through openings 28a-e of the rim 12 are arranged in the circumferential direction between the respective spokes 16a-e between the rim 12. Reference is made in the following to the through opening 28a and the spokes 16a and 16b, wherein the preceding and following statements on the through opening 28a and the spokes 16a and 16b can also be transferred to the other through openings 28b-e and to the other spokes 16c-e and vice versa. As is apparent from FIGS. 9 and 10, the through opening 28a is delimited on both sides in the circumferential direction of the rim 12 by the spokes 16a and 16b. The through opening 28a is delimited to the outside, for example, by the outer ring 22 in the radial direction of the rim 12. The through opening 28a is delimited, for example, to the inside by the central region 20 and/or by the struts 16a, b in the radial direction of the rim 12.

In the arrangement 14, the cover 10 is in particular fastened reversibly detachably on the rim 12. Moreover, the cover 10 is arranged in at least partial, in particular in at least predominant or complete overlap or coverage with the through opening 28a of the rim 12 delimited in the circumferential direction of the rim 12 by the spokes 16a and 16b. In this way, the through opening 28a is at least partially, in particular at least predominantly or completely covered and thus closed in the axial direction of the rim 12 by means of the cover 10. The axial direction of the rim 12 is illustrated in FIG. 9 by a double arrow 30, wherein the axial direction of the rim 12 extends perpendicularly to the radial direction of the rim 12. The axial direction of the rim 12 coincides here with the above-mentioned rotational axis of the rim 12. Moreover, the circumferential direction extends around the rotational axis or around the axial direction.

It is apparent from FIGS. 9 and 10 that, for example, the through openings 28a-e are each assigned at least or precisely one cover 10, so that multiple covers 10 are fastened, in particular reversibly detachably, on the rim 12. In addition, in FIGS. 9 and 10, the above-mentioned forward rotational direction of the wheel and thus of the rim 12, which coincides with the circumferential direction of the rim 12, is illustrated by an arrow 32.

To now be able to implement particularly advantageous aerodynamics of the wheel and thus of the vehicle as a whole in a particularly weight-favorable manner, the cover 10 is directional, so that the wheels of the respective axes spaced apart from one another in the vehicle transverse direction have different covers. The respective cover is also referred to as a cover element, panel, panel element, lid, lid element, or flap. In addition, the cover 10 has multiple slats 34a-f arranged successively or one after another in the circumferential direction of the 12, wherein each two of the slats 34a-f directly or immediately successive in the circumferential direction of the rim 12 delimit at least or precisely one channel 36a-e arranged between them. Air can flow through the channel 36a-e in the installed position of the cover 10, in particular exclusively, diagonally to a plane extending perpendicularly to the axial direction of the rim 12. This imaginary or virtual plane is illustrated in FIG. 10 and identified therein by 38.

In addition, it is provided that the respective two slats 34a-f directly successive in the circumferential direction of the rim 12 at least partially, in particular at least predominantly or completely, mutually cover or overlap one another in the circumferential direction of the rim 12 and along the axial direction of the rim 12. In this case, the respective slats 34a-f mutually overlap in such a way that the respective channel 36a-e is secured with respect to the installed position of the cover 10 both against a through airflow extending precisely along the axial direction of the rim 12 and also against a through airflow extending precisely in the plane 38. The rim 12 occupies its installed position in the completely produced state of the wheel or the vehicle. In particular, the cover 10 assumes its installed position in the arrangement 14. The feature that the respective channel 36a-e is secured both against a through airflow extending precisely along the axial direction of the rim 12 and also against a through airflow extending in the plane 38 is to be understood to mean that air cannot flow through the channel 36a-e precisely along the axial direction of the rim 12 and air also cannot flow through the channel 36a-e precisely in the plane 38 or precisely in the circumferential direction of the rim 12, but rather air can only flow diagonally to the plane 38 through the respective channel 36a-e. This is to be understood in particular to mean that, for example, the respective channel 36a-e extends linearly and at the same time diagonally in relation to the plane 38 or the channel extends curved, so that air can flow through the respective channel 36a-e along a linear flow direction, which extends diagonally to the plane 38 at the same time, or along a curved flow direction. The feature that air can flow through the channel 36a-e, in particular exclusively, diagonally to the plane 38, is to be understood to mean that tangents on the curved flow direction extend here diagonally and not perpendicularly to the plane 38 and also preferably diagonally and not parallel to the plane 38.

Figure 1:
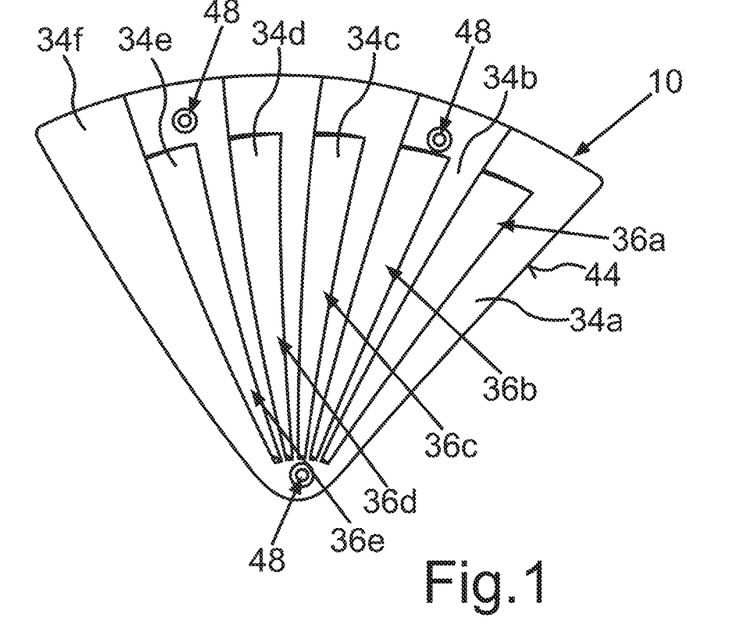
FIG. 1 shows a schematic front view of a cover according to the invention for a rim of a wheel of a vehicle.
Figure 2:
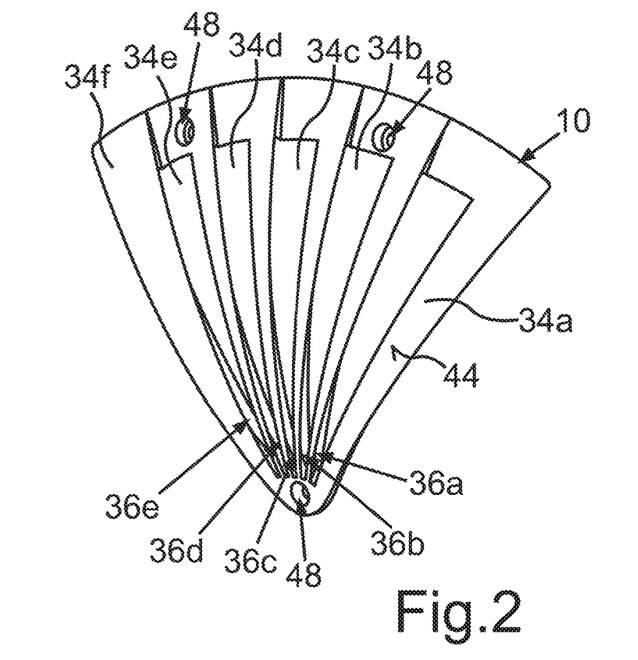
FIG. 2 shows a schematic and perspective front view of the cover.
Figure 3:
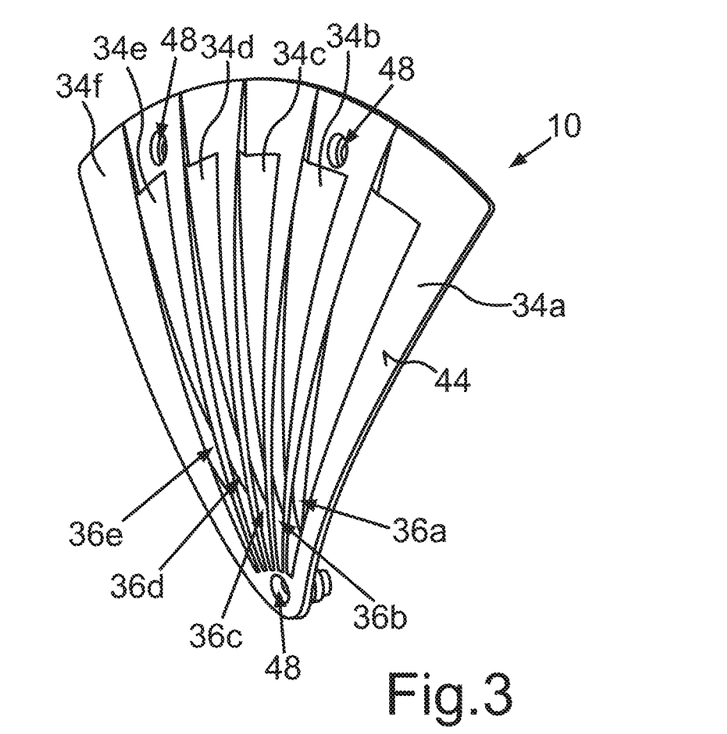
FIG. 3 shows a further schematic and perspective front view of the cover.
Figure 4:
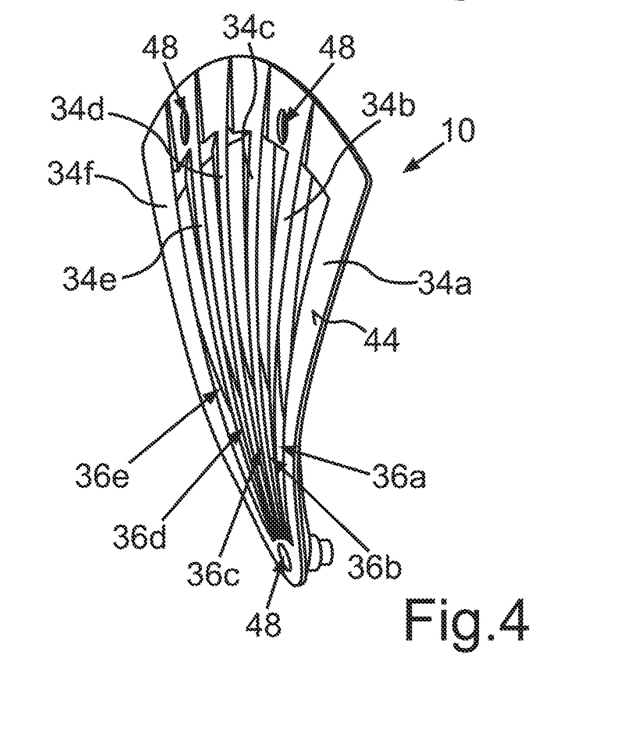
FIG. 4 shows a further schematic and perspective front view of the cover.

It is particularly apparent from FIG. 1 that the slats 34a-f mutually overlap so strongly in the axial direction of the rim 12 that the through opening 28a is completely covered by the cover 10 precisely along the axial direction of the rim 12 and is thus closed. The through opening 28a is also, for example completely closed by the cover 10 in the circumferential direction of the rim 12. The respective channel 36a-e is, however, an opening through which air can flow. In this way, a braking system, which is arranged on a side 40 of the rim 12 facing away in the axial direction of the rim 12 from the cover 10 and is also referred to as the rear side, and which is also simply referred to as a brake, can be supplied with an adequate quantity of air, whereby the braking system can be adequately cooled. Furthermore, the slats 34a-f are oriented against the running direction, so that during a rotation of the wheel in the running direction, i.e., in the forward rotational direction, a negative pressure results or is effectuated by the cover 10 on the rear side (side 40), in particular in the region of the braking system. Hot air is thus discharged forward from the braking system, and sufficient ventilation of the braking system from the rear can be ensured. The feature that the slats 34a-f are oriented against the running direction is to be understood in particular to mean that the slats 34a-f are curved against the forward rotational direction of the rim 12 or the wheel illustrated by the arrow 32. The respective slat 34a-f is thus formed convex, so that the respective slat 34a-f has a convex curve which opposes the forward rotational direction.

In other words, the respective slat 34a-f is convexly curved against the forward rotational direction. It is particularly apparent from FIGS. 9 and 10 that the wheel has a particularly large surface 42, which is closed along the axial direction of the rim 12 and is thus airtight or through which air cannot flow. This large closed surface 42 is partially formed by the rim 12 itself, in particular by the spokes 16a-e, and partially by the respective cover 10. In particular, the respective cover 10 is completely closed along the axial direction of the rim 12, to thus be able to make the closed surface 42 particularly large. Moreover, it is preferably provided that the slats 34a-f mutually overlap completely in the circumferential direction of the rim 12.

Figure 5:
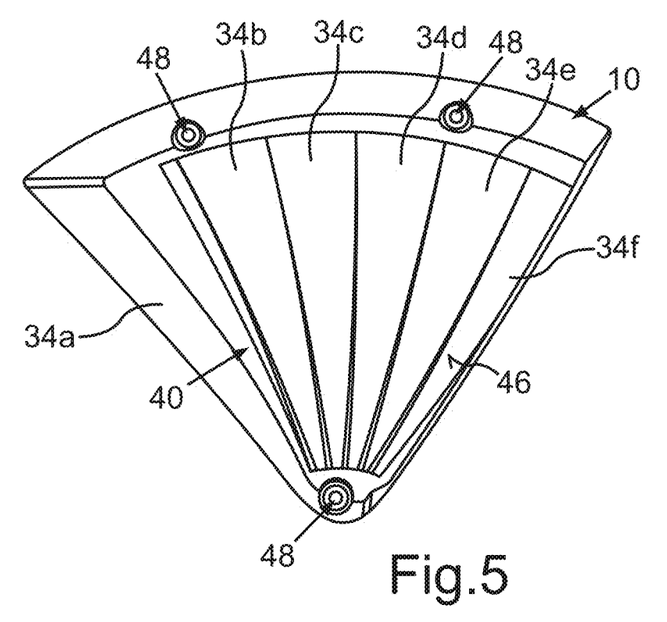
FIG. 5 shows a schematic rear view of the cover.
Figure 6:
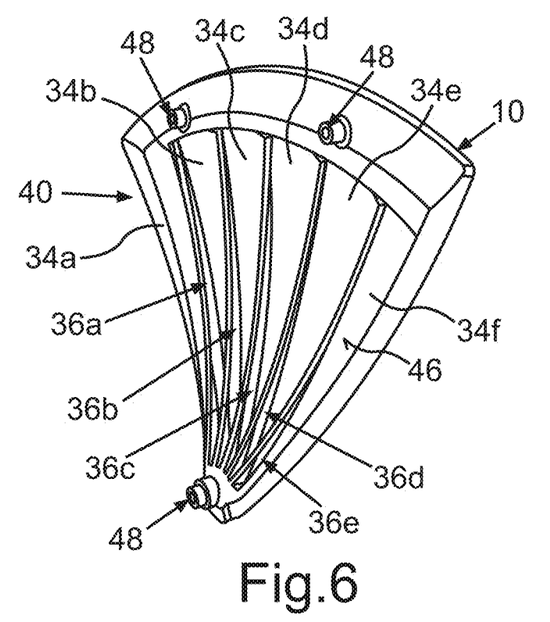
FIG. 6 shows a schematic and perspective rear view of the cover.
Figure 7:
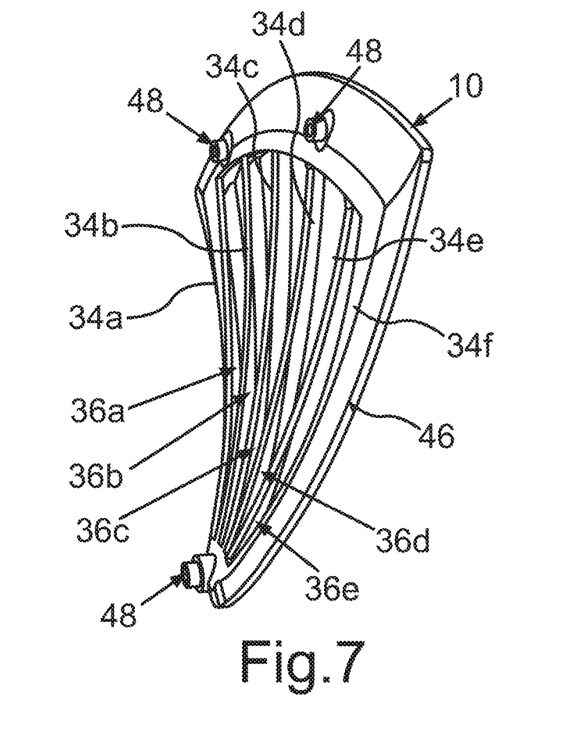
FIG. 7 shows a further schematic and perspective rear-view of the cover.
Figure 8:
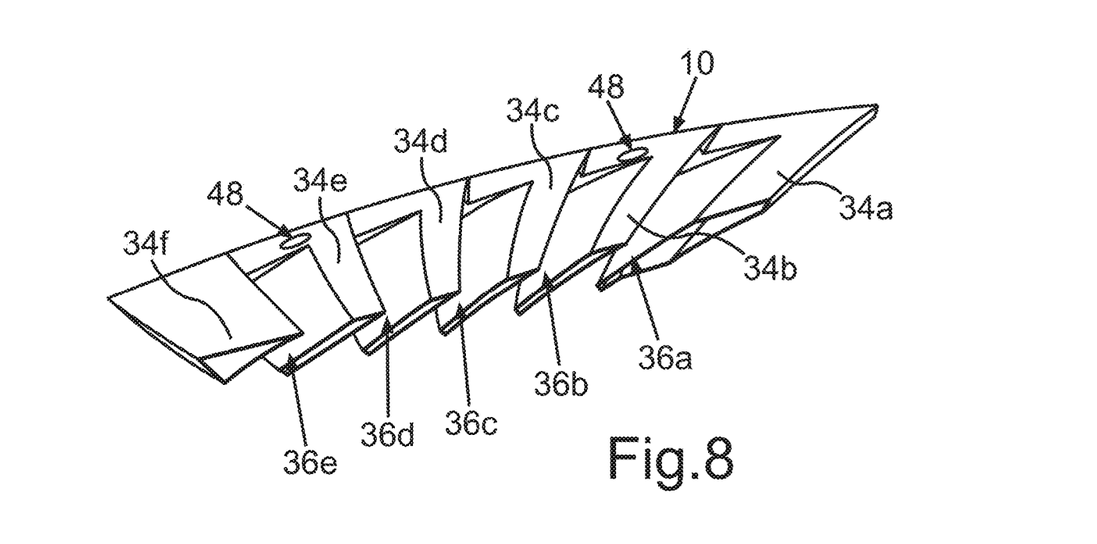
FIG. 8 shows a schematic and perspective sectional view of the cover.

FIGS. 1 to 4 show a front side 44 of the cover 10 facing away from the rim 12 in the axial direction of the rim 12, while FIGS. 5 to 7 show a rear side 46 of the cover 10 facing toward the rim 12 in the axial direction of the rim 12. Moreover, fastening elements 48 are particularly apparent from FIGS. 1 to 7, by means of which the cover 10 can be fastened, in particular reversibly detachably, on the rim 12. For this purpose, the respective fastening element 48 comprises, for example, an opening formed in particular as a through opening, which is also referred to as a screw opening. A fastening part, designed in particular as a screw element, can be guided through the opening, for example, by means of which the cover 10 is fastenable or is fastened on the rim 12. In particular, the cover 10 can be fixedly screwed onto the rim 12 by means of the fastening part. In the arrangement 14 or in the completely produced state of the vehicle, the respective opening is closed by means of the fastening part and/or by means of the rim 12, so that, for example no air can flow along the axial direction of the rim 12 through the cover 10.

The cover 10 is preferably integrally formed, so that the slats 34a-f are integrally formed with one another. It has been shown to be particularly advantageous if the cover 10 is formed from a plastic. The cover 10 is thus formed, for example as a plastic lid. The plastic is preferably a fiber-reinforced plastic, in particular a carbon-fiber-reinforced plastic or carbon, so that a particularly low weight and a particularly high rigidity of the cover 10 can be implemented.

It has furthermore been shown to be particularly advantageous if the cover 10 is produced by a generative manufacturing method and in this case preferably by 3D printing. The plastic lid is produced, for example by means of a 3D printing method from carbon by means of a 3D printing machine to thus be able to implement a particularly cost-effective mass production process. After the 3D printing, the cover 10 is subjected, for example to a finishing process. Alternatively or additionally, it is conceivable that the cover 10 is locked or clipped with the rim 12. It is thus conceivable that the cover 10 is fastened in a friction-locked and/or formfitting manner on the rim 12.

Since the through openings 28*a-e* as such can have air flowing through them, the through openings 28*a-e* in total form a so-called degree of opening of the rim 12. This degree of opening can be completely closed by means of the cover 10. Nonetheless, adequate ventilation of the braking system can be ensured since air can flow in through the channels 36*a-e*. A number and/or an angle enclosed by the respective slats 34*a-f* and/or a respective position of the slats 34*a-f* in relation to one another are dependent on the aerodynamic test results. Since the rim 12 and the cover 10 are formed as components produce separately from one another and connected to one another, which are moreover produced from materials different from one another, the weight of the wheel can be kept to a particularly small amount. In particular, the degree of opening can be at least nearly closed without additional material, from which the rim 12 as such is produced.

The invention claimed is:

1. A cover for a rim of a wheel of a vehicle, comprising:
a fastening of the cover on the rim, arranged to at least partially overlap with a through opening of the rim delimited in the circumferential direction of the rim by respective spokes of the rim, whereby the through opening can be at least partially covered by the cover, wherein the cover is directionally formed and has at least two slats, which delimit at least one channel arranged between the slats, through which air can flow in the installed position of the cover diagonally to a plane extending perpendicularly to the axial direction of the rim, wherein the slats, with respect to the installed position of the cover, at least partially mutually overlap in the circumferential direction of the rim and along the axial direction of the rim.

2. The cover as claimed in claim 1, wherein the slats mutually overlap in such a way that the channel, with respect to the installed position of the cover, is secured both against a through airflow extending precisely along the axial direction of the rim and also against a through airflow extending in the plane.

3. The cover as claimed in claim 1, wherein the slats, with respect to the installed position of the cover, are curved against a forward rotational direction of the rim.

4. The cover as claimed in claim 1, wherein the slats are designed, with respect to the installed position of the cover, to effectuate a negative pressure on a rear side of the cover facing toward the rim during a rotation of the rim and the cover fastened thereon taking place in the forward rotational direction of the rim.

5. The cover as claimed in claim 1, wherein the slats, with respect to the installed position of the cover, completely mutually overlap in the circumferential direction of the rim.

6. The cover as claimed in claim 1, wherein the slats are integrally formed with one another.

7. The cover as claimed in claim 1, wherein the cover is formed from a plastic.

8. The cover as claimed in claim 1, wherein the cover is produced by a generative manufacturing method.

9. An arrangement of at least one cover on a rim for a wheel of a vehicle, comprising:
the cover is fastened on the rim and is arranged to at least partially overlap with a through opening of the rim delimited in the circumferential direction of the rim by respective spokes of the rim, whereby the through opening is at least partially covered by the cover in the axial direction of the rim,
wherein the cover is directionally formed and has at least two slats, which at least partially mutually overlap in the circumferential direction of the rim and along the axial direction of the rim and delimit at least one channel arranged between the slats, through which air can flow diagonally to a plane extending perpendicularly to the axial direction of the rim.

10. The arrangement as claimed in claim 9, wherein the through opening is at least predominantly covered by the cover in the axial direction of the rim.

* * * * *